United States Patent [19]
Isaksson

[11] Patent Number: 5,499,498
[45] Date of Patent: Mar. 19, 1996

[54] PRESSURIZED FLUIDIZED BED REACTOR

[75] Inventor: Juhani Isaksson, Karhula, Finland

[73] Assignee: Foster Wheeler Energia Oy, Karhula, Finland

[21] Appl. No.: 421,312

[22] Filed: Apr. 13, 1995

Related U.S. Application Data

[62] Division of Ser. No. 200,327, Feb. 23, 1994.

[51] Int. Cl.$^6$ ....................................................... F02C 3/28
[52] U.S. Cl. ........................................ 60/39.12; 60/39.464
[58] Field of Search ................................ 60/39.02, 39.12, 60/39.29, 39.464, 39.091; 431/7, 170

[56] References Cited

U.S. PATENT DOCUMENTS 3,924,402  12/1975  Harboe .
4,744,212   5/1988  Andersson et al. .
4,761,133   8/1988  Bülbring .
4,909,028   3/1990  Cetrelli et al. .

Primary Examiner—Timothy S. Thorpe
Attorney, Agent, or Firm—Nixon & Vanderhye

[57] ABSTRACT

A pressurized fluid bed reactor power plant includes a fluidized bed reactor contained within a pressure vessel with a pressurized gas volume between the reactor and the vessel. A first conduit supplies primary gas from the gas volume to the reactor, passing outside the pressure vessel and then returning through the pressure vessel to the reactor, and pressurized gas is supplied from a compressor through a second conduit to the gas volume. A third conduit, comprising a hot gas discharge, carries gases from the reactor, through a filter, and ultimately to a turbine. During normal operation of the plant, pressurized gas is withdrawn from the gas volume through the first conduit and introduced into the reactor at a substantially continuously controlled rate as the primary gas to the reactor. In response to an operational disturbance of the plant, the flow of gas in the first, second, and third conduits is terminated, and thereafter the pressure in the gas volume and in the reactor is substantially simultaneously reduced by opening pressure relief valves in the first and third conduits, and optionally by passing air directly from the second conduit to the turbine.

10 Claims, 1 Drawing Sheet

PRESSURIZED FLUIDIZED BED REACTOR

The Government of the United States of America has rights in this invention pursuant to Contract No. DE-FC21-91MC-27364 awarded by the U.S. Department of Energy.

This is a divisional of application Ser. No. 08/200,327, filed Feb. 23, 1994.

BACKGROUND AND SUMMARY OF THE INVENTION

In conventional pressurized fluidized bed reactor power plants, a fluidized bed reactor is enclosed by a pressure vessel which is connected to a compressor for compressing gas (typically air) to superatmospheric pressure and delivering it to the pressure vessel at a pressure of about 2–100 bar. The compressed air is fed into a gas volume defined between the pressure vessel and the fluidized bed reactor. By combustion of coal or other carbonaceous fuel in the reactor, hot gases are generated. Particles are removed from the hot gases, and then they are fed to a turbine or a like expansion means, for example for generating electricity.

Disturbances may occur in the operation of the power plant, such as a sudden interruption in the fuel supply, loss of GT-generator load, a pulsation of the pressure in the gas volume, etc. Under these circumstances, it is necessary to stop the supply of pressurized air into the pressure vessel. In order to protect the turbine and compressor from damage caused by operational disturbances, it has been suggested in U.S. Pat. No. 4,744,212 (the disclosure of which is hereby incorporated by reference herein) to provide the conduit for supplying pressurized gas to the pressure vessel, and the conduit for transporting hot pressurized gas to the turbine, with valves which close these flow paths, thus protecting the compressor and turbine from damage by disconnecting them from the rest of the system. Also it is suggested to provide a short circuit conduit between the compressor and the turbine for passing gas from the compressor directly to the turbine when the valves are closed.

While the system described above can be effective under some circumstances, it is not entirely effective or practical. The shutoff valve in the conduit for the hot gases to the turbine must be manufactured to extremely tight tolerances, and if it is not it is incapable of completely closing off the hot gas discharge, and therefore it is inevitable that at least a portion of the gas may leak into the turbine. Also this valve is large and must endure extremely adverse thermal conditions, is expensive, and slow in :operation, thereby handicapping the control of the entire system.

It also has been suggested in the prior art that the pressure in the pressure vessel be reduced by discharging the gas from the vessel into the atmosphere through valves in the outer wall of the vessel upon operational disturbances. However since the valve for sealing the hot gas conduit cannot be effectively completely closed, and if the supply of fuel is interrupted or completely stopped gas may enter the turbine through the reactor and filter. Since this gas is considerably cooler than the gases during normal operation, the equipment is subjected to a harsh thermal shock which can easily damage the filters (e.g. typically ceramic type filters, such as candle filters), and the turbine. As in normal operation (normal shutdown procedures), as a result of the operational disturbances care must be taken to ensure that the pressure differential between the reactor and the gas volume does not exceed a predetermined value, otherwise the walls of the reactor can collapse.

According to the present invention, a method and apparatus are provided which overcome the problems discussed above in operating a pressurized fluidized bed reactor, enabling safe operation both during normal operation, and as a result of operational disturbances. The invention is capable of effecting an almost immediate shutdown of the plant in such a way that damage does not occur to the components of the plant. Care is particularly taken to shut off the passage of relatively cool air to the reactor. The reactor is normally operated at high temperature, typically greater than 800° C. (typically 800°–1200° C.), and if cold air flows substantially uncontrolled into the reactor rapid cooling of the hot components within and associated with the reactor would cause highly adverse thermal stress in the steel, refractory, and other components. Since the pressurized gas volume between the pressure vessel and the reactor is large, if the entire volume is allowed to vent into the reactor upon operational disturbance, damage to at least some of the reactor components, or the downstream filters, is almost certain to occur.

In addition to providing substantial advantages during operational disturbances, according to the present invention it is also possible to advantageously operate the reactor in a different manner even during normal operation. According to this aspect of the invention, not only is it possible to prevent collapse of the reactor due to too high of a pressure differential between the gas volume and the reactor, during normal operation it is possible to control the pressure differential by continuously controlling the passage of gas from the gas volume to the reactor, the gas being supplied as primary gas to the fluidized bed reactor.

According to one aspect of the present invention a method of operating a pressurized fluidized reactor power plant is provided. The power plant includes: a fluidized bed reactor supplied with fuel and contained within a pressure vessel with a pressurized gas volume defined between the reactor and the pressure vessel, a compressor for supplying gas under superatmospheric pressure to the gas volume, a first conduit for supplying primary gas from the gas volume to the reactor, a hot gas discharge from the reactor which passes through the pressure vessel, and a turbine operatively connected to the hot gas discharge. The method comprises the steps of, in response to an operational disturbance of the power plant: (a) Automatically terminating the passage of gas through the first conduit from the gas volume to the reactor. And, (b) generally simultaneous with step (a), automatically terminating the supply of compressed gas from the compressor to the gas volume. There is also preferably the further step (c) of generally simultaneously with steps (a) and (b), automatically terminating the flow of hot gas from the hot gas discharge to the turbine. There may also be the further step (d) of generally simultaneously with or after steps (a)–(c), substantially simultaneously automatically reducing the pressure in the gas volume and in the reactor. Also there may be the further step (e) of automatically monitoring the pressure differential between the rector and the gas volume, and practicing step (d) in response to step (e) so that the pressure differential between the reactor and gas volume does not exceed a predetermined amount. [The term "generally simultaneously" as used herein means simultaneously or somewhat before or after.]

Typically, but not necessarily, the first conduit extends from the gas volume to the outside of the pressure vessel, and then into the reactor, and a first valve is provided in the conduit substantially immediately adjacent (as close to as practical under the particular circumstances) the exterior of the pressure vessel. Then step (a) is practiced by substantially immediately automatically closing the first valve at the onset of the operational disturbance, so that from the onset of the operational disturbance a minimum volume of gas passes from the gas volume to the reactor. Alternatively the valve may be disposed within the pressure vessel if desired.

The compressor is also outside the pressure vessel and connected to the gas volume by a second conduit having a second valve therein substantially immediately adjacent and exteriorly of the pressure vessel. In that case step (b) is practiced by substantially immediately automatically closing the second valve at the onset of the operational disturbance, so that from the onset of the operational disturbance a minimum volume of gas passes from the compressor to the gas volume. There may also be the further step of, generally simultaneously with step (b), directing compressed gas directly from the compressor to the turbine.

According to another aspect of the present invention a method of operating a pressurized fluidized bed power plant is provided which comprises the following steps: (a) Supplying gas under superatmospheric pressure from the compressor to the gas volume. (b) Combusting or gasifying fuel in the reactor, producing hot gases. (c) Passing the hot gases from the reactor to the turbine. And, (d) withdrawing gas under superatmospheric pressure from the gas volume, passing the gas out of the pressure vessel, and reintroducing the gas through the pressure vessel into the reactor at a substantially continuously controlled rate.

In the case of gasification, after step (b) there is also a post-combustion of the hot gases prior to introduction to the turbine. Step (d) is typically practiced to supply the gas as primary gas to the fluidized bed reactor, and secondary and tertiary gas can also be provided from the compressor. During an operational disturbance the supply of gases to the reactor and the gas volume can be terminated as described above.

According to another aspect of the present invention a pressurized fluidized bed power plant is provided which comprises the following components: A pressure vessel. A fluidized bed reactor contained within the pressure vessel with a pressurized gas volume defined between said reactor and the pressure vessel. A first conduit for supplying primary gas from the gas volume to the reactor. A compressor for supplying gas under superatmospheric pressure to the gas volume through a second conduit. A hot gas discharge from the reactor, including a portion which passes through the pressure vessel. Means for separating particles from the hot gas discharge. A turbine operatively connected to the hot gas discharge. A first automatically controlled valve disposed in the first conduit for allowing or preventing the supply of primary gas from the gas volume to the reactor. And, a second automatically controlled valve disposed in the second conduit for allowing or preventing the passage of gas at superatmospheric pressure from the compressor to the gas volume. The first and second valves are preferably disposed exteriorly of the pressure vessel and substantially immediately adjacent to it, so as to minimize the volume of gas which passes to the reactor or the gas volume after closing of the first and second valves due to an operational disturbance.

The power plant also preferably comprises a third conduit branching from the second conduit for supplying secondary and tertiary air through the pressure vessel into the reactor, with an automatically controlled valve disposed in each of the secondary and tertiary lines and also controlled by the controller.

Hot gases discharged from the reactor preferably pass through a ceramic filter arrangement or the like, before passing to the turbine. A pressure relief valve can be disposed in the hot gas discharge and in the first conduit, with the controller also controlling operation of the pressure relief valves. As disclosed in U.S. Pat. No. 4,744,212, valves can :also be disposed in the second conduit and the hot gas discharge immediately adjacent the compressor and turbine, respectively, with a bypass valve for directing compressed air directly from the compressor to the turbine, and all the valves controlled by the controller. A pressure monitoring means also may be provided for monitoring the differential pressure between the reactor and the gas volume, and for providing this information to the controller, which then can control the various valves to ensure that pressure differential does not exceed a predetermined amount (which would cause damage to the reactor, or downstream components).

It is the primary object of the present invention to provide a method and apparatus for preventing damage to a pressurized fluidized bed reactor power plant components as a result of an operational disturbance, and to improve normal operation thereof. This and other objects of the invention will become clear from an inspection of the detailed description of the invention and from the appended claims.

DETAILED DESCRIPTION OF THE DRAWING

Figure 1:
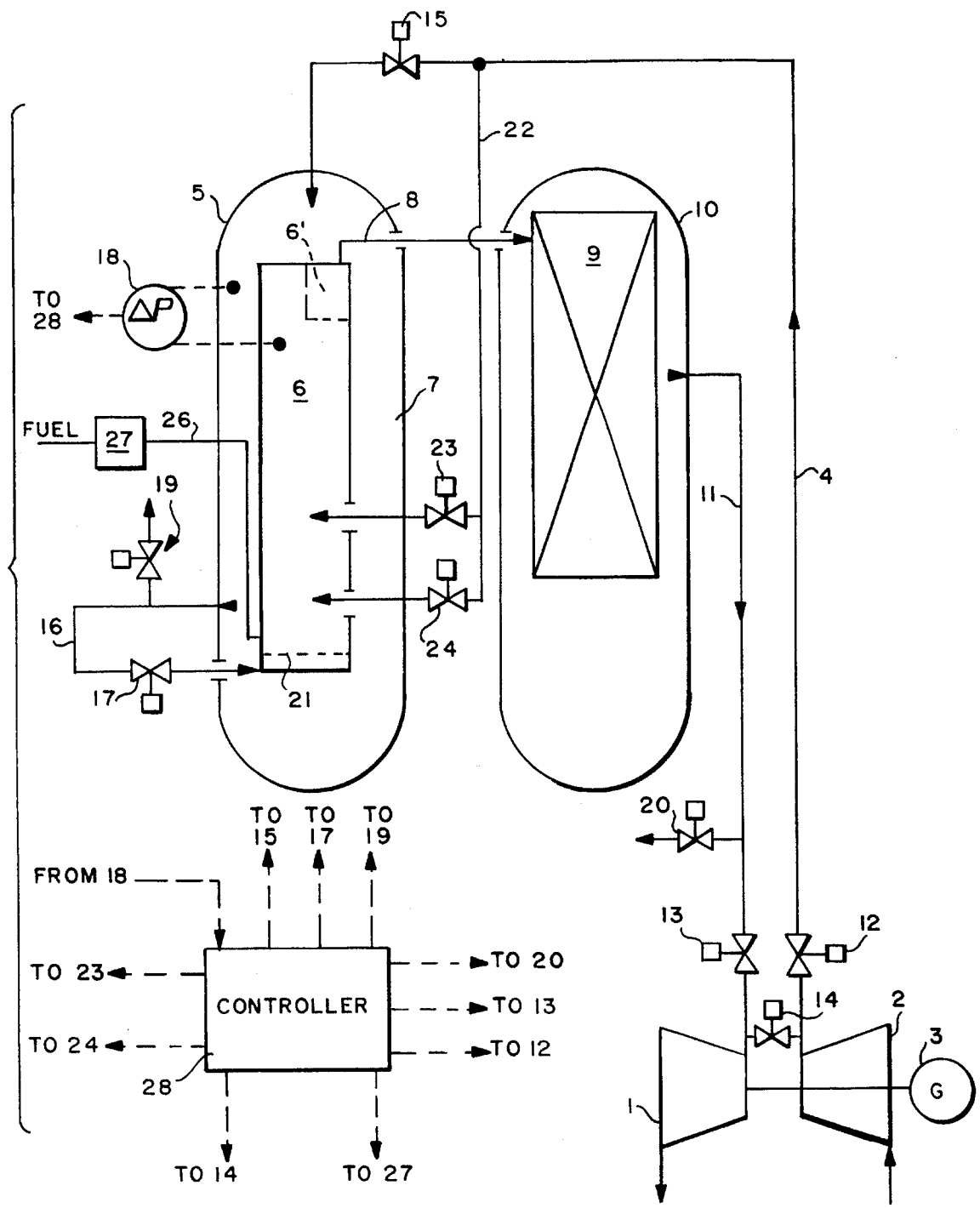
FIG. 1 is a schematic view of an exemplary pressurized fluidized bed power plant according to the present invention, for practicing the methods according to the present invention.

FIG. 1 illustrates a conventional gas turbine 1 and gas compressor 2 connected to each other and to a generator 3 for generating electricity. Gas—typically air—is compressed by the compressor 2 to a pressure higher than atmospheric, e.g. 2–100 bar, using one or more compressing stages. The gas is conveyed by the conduit 4 to a pressure vessel 5. The pressure vessel 5 encloses a fluidized bed reactor 6, and a pressurized gas volume 7 is defined between the exterior of the reactor 6 and the interior of the pressure vessel 7. The reactor 6 is conventional and typically comprises a circulating fluidized bed reactor for combusting coal or other particulate fuel. While a circulating fluidized bed reactor is desired as the reactor 6, it also may comprise a bubbling reactor or a pneumatic conveying reactor, which are other types of conventional fluidized bed reactors. Thus the fluidized bed reactor 6 may be operated in a velocity range of about 1–50 m/s.

Typically the conduit 4 enters the pressure vessel 5 adjacent the top of the vessel 5, and remote from the bottom of the reactor 6 into which primary gas for combustion and tier fluidizing particles within the bed of the reactor 6 is introduced. Introduction of the gas at the top of the vessel 5 via conduit 4 also enhances the cooling affect of the gas, maintaining the temperature of the vessel 5 below a predetermined desired temperature.

If the reactor 6 is a circulating fluidized bed or a pneumatic conveyor type reactor, it is provided with a separator 6', such as a cyclone separator, for separating solids entrained by combustion gases from the gases. While the solids are recirculated to the bed of the reactor 6, the gases are transported via discharge conduit 8 through the wall of the pressure vessel 5 to a subsequent separating means 9, such as a ceramic filter. While in the embodiment illustrated in FIG. 1 the second separator 9 is shown as mounted within a second pressure vessel 10, alternatively the separator 9 could be mounted within the vessel 5. In any event, purified gases from the second separator 9 pass via the hot gas discharge conduit 11 from the pressure vessel 10 (or 5) to the turbine 1 for expansion.

During normal operation, combustion or gasification of fuel—such as coal or other carbonaceous fuel—occurs in the fluidized bed reactor 6. If, however, due to an operational disturbance, such as a sudden loss of load of the turbine 1 or generator 3, an interruption of the supply of fuel (through 26) being fed to the reactor 6, wide pressure fluctuations, or the like, occurs the supply of gas from the compressor 2 to the pressure vessel 5 gas volume 7 is terminated as by automatically closing the automatic valve (e.g. solenoid valve) 12. Also, it is desirable to automatically close the automatic valve 13 in the hot gas discharge line 11 terminating the flow of hot gases to the turbine 1. The automatic valve 14 in the short conduits between the valve 12 and compressor 2, and the valve 13 and turbine 1, can be opened automatically when valves 12, 13 are closed to direct compressed air from the compressor 2 directly to the turbine 1, as shown in U.S. Pat. No. 4,744,212.

According to the present invention, it is highly desirable to provide the valve 15 typically in addition to, but under some circumstances in place of, the valve 12. The valve 15, also an automatically operated (e.g. solenoid) valve, is disposed substantially immediately adjacent the pressure vessel 5, and typically exteriorly of the vessel 5 so that it can be accessed for easy maintenance, replacement or repair. By utilizing the valve 15 to shut off the flow of compressed gas in the conduit 4 to the gas volume 7, as a result of an operational disturbance, the volume of gas which passes from the compressor 2 to the gas volume 7 from the onset of a operational disturbance is minimized.

In addition to providing a valve 15 according to the present invention, the invention also preferably utilizes the conduit 16 for supplying gas from the gas volume 7 to the reactor 6. An automatically controlled valve 17 is provided in the first conduit 16 preferably as positioned in FIG. 1—that is substantially immediately adjacent the pressure vessel 5 although exteriorly thereof. By mounting it exteriorly of the vessel 5 the valve 17 is accessible for repair or servicing, and by mounting it substantially immediately adjacent the vessel 5 a minimum volume of gas passes from the gas volume 7 to the reactor 6 from the onset of an operational disturbance. The air supplied through the conduit 16 from the gas space 7 to the reactor 6 is preferably primary air for fluidizing particles (and providing combustion gas) at the bottom of the reactor 6, e.g. being introduced by the conventional windbox/grid 21.

In addition to quickly and efficiently cutting off the flow of compressed gas in conduit 4 to the vessel 5, and the flow of pressurized gas through the conduit 16 to the reactor 6, according to the present invention it is desirable to reduce the pressure in the gas volume 7 generally simultaneously with closing of the valves 15, 17. This reduction in pressure is preferably effectively accomplished by monitoring the pressure differential between the reactor 6 and the gas volume 7 to ensure that it is not large enough to cause collapse of the reactor 6 or other negative impact, and this is facilitated utilizing the conventional electronic pressure monitor 18. The pressure monitor 18 senses the pressure differential between the interior of the reactor 6 and the gas volume 7 and this information is ultimately utilized to open the automatically controlled pressure relief valves 19, 20 in the first conduit 16, and the hot gas discharge conduit 11, respectively. The valves 19, 20 are controlled so as to have an orderly pressure reduction while making sure that the pressure differential is below a predetermined value.

The invention also preferably utilizes a third conduit 22, which is a branch of the conduit 4 from the compressor 2, which itself has two branches to provide secondary and tertiary air to the interior of the reactor 6. An automatically controlled valve 23 is in the tertiary air conduit, and an automatically controlled valve 24 is in the secondary air conduit.

For many operational disturbances it also is desirable to shut off the flow of fuel to the reactor 6 (if that has not already occurred in the operational disturbance). As illustrated schematically in FIG. 1, fuel solid particles, slurry, paste, liquid, or the like is typically supplied in the conduit 26 to the reactor 6, and some sort of a control mechanism 27 is provided in the conduit 26 to either provide or cut off the supply of fuel when desired. The control mechanism 27 may be a pump (e.g. piston-type in the case of fuel paste), feeder, valve, or the like, and preferably is controlled to cut off the fuel supply in line 26 generally simultaneously with the closing of the valves 15, 17.

Automatic control of all of the valves 12–15, 17, 19, 20, 23, and 24, and mechanism 27, may be provided by a conventional master controller 28, such as a computer controller. The controller 28 receives data from the pressure differential monitor 18, and also preferably is connected up to various sensor mechanisms associated with the power plant illustrated in FIG. 1 or related components, to sense operational disturbances. The controller 28 then operates all of the valves so as to immediately shut off the flow of gas to the vessel 5 and reactor 6, and preferably also the flow of secondary and tertiary air to the reactor 6, and then to generally simultaneously vent the pressure through valves 19, 20, close off valves 12 and 13, and open valve 14 to direct any compressed gas from the compressor 2 directly to the turbine 1.

The valves 19, 20 are typically also controlled to maintain the pressure inside the reactor 6 lower than the pressure in the gas volume 7 to ensure that no gas passes from the reactor 6 to the gas volume 7.

In addition to the apparatus of FIG. 1 being suitable and effective during operational disturbances, it is also highly advantageous for normal operation. Utilizing the first conduit 17 which extends exteriorly of the pressure vessel 5 from the gas volume 7, and then passes through the valve 17 to the grid 21 at the bottom of reactor 6, a continuously controlled rate of introduction of gas to the reactor 6 may be provided, which has a number of operational advantageous. By controlling the valves 17, 23, 24 with the controller 28, any desired division of flow from the compressor 2 can be provided, as can the rate of flow (from the maximum flow rate to nothing) to grid/windbox 1. Control also may be effected, in this regard, by controlling the amount of or rate of gas introduced through conduit 4 by controlling valve 15. This arrangement is particularly desirable for staged combustion, e.g. for minimizing $NO_x$ formation.

It will thus be seen that according to the present invention advantageous methods and advantageous apparatus have been provided associated with a pressurized fluidized bed reactor power plant. While the invention has been herein shown and described in what is presently conceived to be the most practical and preferred embodiments it is apparent to those of ordinary skill in the art that many modifications may be made thereof within the scope of the invention, which scope is to be accorded the broadest interpretation of the appended claims so as to encompass all equivalent methods and apparatus.

What is claimed is:

1. A pressurized fluidized bed power plant, comprising:

a pressure vessel;

a fluidized bed reactor contained within said pressure vessel with a pressurized gas volume defined between said reactor and said pressure vessel;

a first conduit for supplying primary gas from the gas volume to said reactor;

a second conduit;

a compressor for supplying gas at a pressure above atmospheric pressure to the gas volume through said second conduit;

a hot gas discharge from said reactor, including a portion which passes through said pressure vessel;

means for separating particles from said hot gas discharge;

a turbine operatively connected to said hot gas discharge;

a first automatically controlled valve disposed in said first conduit for allowing or preventing the supply of primary gas from the gas volume to said reactor; and a second automatically controlled valve disposed in said second conduit for allowing or preventing the passage of gas at superatmospheric pressure from said compressor to the gas volume.

2. A power plant as recited in claim 1 wherein said first and second valves are disposed exteriorly of said pressure vessel and substantially immediately adjacent thereto; and further comprising a controller for automatically closing said first and second valves in response to an operational disturbance of said plant.

3. A power plant as recited in claim 2 further comprising a pressure relief valve disposed in said first conduit between said gas volume and said first automatically controlled valve, and a second pressure relief valve disposed in said hot gas discharge between said pressure vessel and said turbine.

4. A power plant as recited in claim 3 further comprising means for monitoring the pressure differential between said fluidized bed reactor and the gas volume, and controlling said first and second pressure relief valves in response to said sensing to ensure that the pressure differential between said fluidized bed reactor and said gas volume does not exceed a predetermined amount.

5. A power plant as recited in claim 1 further comprising shutoff valves disposed in said second conduit adjacent said compressor, and said hot gas discharge adjacent said turbine, short conduits extending between said shutoff valves and said compressor and turbine respectively, and a third automatically controlled valve for connecting said short conduits to each other to allow compressed gas to pass directly from said compressor to said turbine.

6. A power plant as recited in claim 2 further comprising shutoff valves disposed in said second conduit adjacent said compressor, and said hot gas discharge adjacent said turbine, short conduits extending between said shutoff valves and said compressor and turbine respectively, and a third automatically controlled valve for connecting said short conduits to each other to allow compressed gas to pass directly from said compressor to said turbine.

7. A power plant as recited in claim 3 further comprising shutoff valves disposed in said second conduit adjacent said compressor, and said hot gas discharge adjacent said turbine, short conduits extending between said shutoff valves and said compressor and turbine respectively, and a third automatically controlled valve for connecting said short conduits to each other to allow compressed gas to pass directly from said compressor to said turbine.

8. A power plant as recited in claim 4 further comprising shutoff valves disposed in said second conduit adjacent said compressor, and said hot gas discharge adjacent said turbine, short conduits extending between said shutoff valves and said compressor and turbine respectively, and a third automatically controlled valve for connecting said short conduits to each other to allow compressed gas to pass directly from said compressor to said turbine.

9. A power plant as recited in claim 1 further comprising a pressure relief valve disposed in said first conduit between said gas volume and said first automatically controlled valve, and a second pressure relief valve disposed in said hot gas discharge between said pressure vessel and said turbine.

10. A power plant as recited in claim 9 further comprising means for monitoring the pressure differential between said fluidized bed reactor and the gas volume, and controlling said first and second pressure relief valves in response to said sensing to ensure that the pressure differential between said fluidized bed reactor and said gas volume does not exceed a predetermined amount.

* * * * *